(12) United States Patent
Chen

(10) Patent No.: US 10,284,126 B2
(45) Date of Patent: May 7, 2019

(54) METHOD OF GENERATING ELECTRICITY BY AN ALTERNATOR AND A GENERATOR USING THE SAME

(76) Inventor: Weijia Chen, Suzhou (CN)

( * ) Notice: Subject to any disclaimer, the term of this patent is extended or adjusted under 35 U.S.C. 154(b) by 721 days.

(21) Appl. No.: 13/982,597

(22) PCT Filed: Nov. 15, 2011

(86) PCT No.: PCT/CN2011/082187
§ 371 (c)(1),
(2), (4) Date: Jun. 30, 2016

(87) PCT Pub. No.: WO2012/100578
PCT Pub. Date: Aug. 2, 2012

(65) Prior Publication Data
US 2016/0336889 A1 Nov. 17, 2016

(30) Foreign Application Priority Data

Jan. 30, 2011 (CN) .......................... 2011 1 0033174

(51) Int. Cl.
| | |
|---|---|
| *H02K 1/12* | (2006.01) |
| *H02K 1/27* | (2006.01) |
| *H02P 9/42* | (2006.01) |
| *H02K 11/04* | (2016.01) |
| *H02K 16/04* | (2006.01) |

(52) U.S. Cl.
CPC ................ *H02P 9/42* (2013.01); *H02K 1/12* (2013.01); *H02K 1/27* (2013.01); *H02K 11/046* (2013.01); *H02K 16/04* (2013.01)

(58) Field of Classification Search
USPC ....................................... 322/10, 90; 290/4 R
See application file for complete search history.

(56) References Cited

U.S. PATENT DOCUMENTS

| | | | | |
|---|---|---|---|---|
| 372,934 | A | * | 11/1887 | Shallenberger ........... H02J 3/38 307/84 |
| 2,437,275 | A | * | 3/1948 | Skene ...................... H01Q 3/08 315/378 |

(Continued)

*Primary Examiner* — Pedro J Cuevas
(74) *Attorney, Agent, or Firm* — Han IP PLLC; Andy M. Han

(57) ABSTRACT

A method of generating electricity by an alternator and a generator is disclosed. The method includes: connecting in series stator coils of two multi-pole permanent-magnet generators that can generate equiamplitude alternating currents of different frequencies to generate equiamplitude alternating currents of different frequencies that are superimposed to generate an amplitude-modulation alternating current with envelope lines having an amplitude that changes with a voltage difference between two equiamplitude alternating currents; rectifying the amplitude-modulation alternating current positively and negatively through a controllable rectifying circuit; and filtering to output an alternating current having frequency of the envelope lines. An alternator according to the present disclosure has not only all the advantages of the existing inverting generator, but also a manufacturing cost consumedly lower than the existing inverting generator, even lower than a general universal generator, without the high-frequency electromagnetic wave, thus meeting the existing European EMC certification requirements.

6 Claims, 5 Drawing Sheets

(56) References Cited

U.S. PATENT DOCUMENTS

| | | | | |
|---|---|---|---|---|
| 2,878,397 A * | 3/1959 | Foster | H02J 3/00 | 290/4 A |
| 3,134,038 A * | 5/1964 | Schilling | H02K 3/18 | 310/156.26 |
| 3,173,076 A * | 3/1965 | Adkins | H02K 19/24 | 322/47 |
| 3,237,034 A * | 2/1966 | Krasnow | H02K 21/14 | 310/156.23 |
| 4,045,718 A * | 8/1977 | Gray | H02J 7/1423 | 307/16 |
| 4,382,188 A * | 5/1983 | Cronin | F16H 15/38 | 290/1 C |
| 4,684,813 A * | 8/1987 | Watson | H02P 9/00 | 290/4 A |
| 4,694,187 A * | 9/1987 | Baker | H02K 7/1807 | 290/1 R |
| 4,777,376 A * | 10/1988 | Dishner | F02N 11/04 | 290/38 R |
| 4,868,406 A * | 9/1989 | Glennon | F02N 11/04 | 290/4 R |
| 4,908,565 A * | 3/1990 | Cook | H02P 9/08 | 290/4 R |
| 5,023,537 A * | 6/1991 | Baits | F02N 11/04 | 290/4 R |
| 5,258,697 A * | 11/1993 | Ford | B60L 11/1807 | 310/156.12 |
| 7,262,539 B2 * | 8/2007 | Dooley | H02K 21/046 | 310/113 |
| 7,391,126 B2 * | 6/2008 | Liu | F03D 7/00 | 290/44 |
| 7,573,144 B1 * | 8/2009 | Saban | H02J 3/30 | 290/4 R |
| 7,710,081 B2 * | 5/2010 | Saban | H02K 3/28 | 290/4 R |
| 8,648,559 B2 * | 2/2014 | Singh | B60L 15/007 | 318/400.42 |
| 9,154,067 B2 * | 10/2015 | Frampton | H02P 9/04 | |
| 2002/0084705 A1 * | 7/2002 | Kawamura | H02K 11/0094 | 310/68 R |
| 2006/0113967 A1 * | 6/2006 | Dooley | H02K 21/046 | 322/57 |
| 2008/0001408 A1 * | 1/2008 | Liu | F03D 7/00 | 290/44 |
| 2009/0200809 A1 * | 8/2009 | Saban | H02J 3/30 | 290/4 R |
| 2012/0235617 A1 * | 9/2012 | Singh | B60L 15/007 | 318/400.42 |
| 2013/0181688 A1 * | 7/2013 | Tupper | H02P 9/02 | 322/61 |
| 2018/0198395 A1 * | 7/2018 | Gieras | H02P 9/32 | |
| 2018/0262091 A1 * | 9/2018 | Gieras | H02K 21/042 | |
| 2018/0331591 A1 * | 11/2018 | Liu | H02K 1/2786 | |

\* cited by examiner

METHOD OF GENERATING ELECTRICITY BY AN ALTERNATOR AND A GENERATOR USING THE SAME

CROSS REFERENCE TO RELATED APPLICATIONS

This application is the U.S. national phase application of International application number PCT/CN2011/082187, filed on 15 Nov. 2011, which claims the priority benefit of China Patent Application No. 201110033174.4 filed on 30 Jan. 2011. The above-identified applications are hereby incorporated by reference in their entirety.

TECHNICAL FIELD

The present disclosure relates to a method of generating electricity by an alternator and a generator using the same.

BACKGROUND

The development of inverting generators, because of its small size, light weight, good electrical properties and many other advantages, has progressed rapidly in recent years in the field of small engine generators. The working principle of existing inverting generators is as follows: A multi-pole AC permanent-magnet generator is used for generating an equiamplitude alternating current of higher frequency, which is rectified into a constant direct current through a controllable rectifying method and then converted into the desired alternating current through an inverting circuit, which is commonly known as the ADA way.

An existing ADA inverting circuit chops the direct current through a bridge circuit and an IGBT power transistor, and then the waveform is shaped through an LC circuit, so as to restore it into an AC sine wave. Because a greater switching loss may be caused due to the use of the IGBT power transistor working at the chopping frequency of 20 K, the transistor generates heat and suffers from power loss and reduced efficiency. Meanwhile, the high-power inductor used for shaping the chopped waveform also generates much heat and thus results in a great loss. At the same time the multiple harmonics having the chopping frequency of 20 K may generate a high-frequency electromagnetic wave. If the power of the generator is to be increased, the electromagnetic wave will also be increased, which will be unable to meet the existing European EMC certification requirements.

In the prior art, the alternating current close to the sine waveform can also be obtained by rectifying the equiamplitude alternating current of higher frequency directly with the controllable rectifying method and meanwhile controlling the conduction angle at different times. However, the waveform has a greater degree of distortion, which will change more greatly under different loads, and thus the requirements of many electric appliances cannot be met.

From a cost perspective, prices of the IGBT high-power transistor, the high-capacity electrolytic capacitor, and the high-power inductor used in the ADA inverting mode tend to be high, and the specification of the IGBT transistor increases with the current, with the price increasing exponentially, and thus the cost will be higher for the manufacture of a generator having a power of 5 kW or greater. Therefore, currently it is difficult to replace traditional generators with inverting generators.

SUMMARY

A purpose of the present disclosure is to provide a method of generating electricity by an alternator, by which the alternator can generate a sine wave output voltage having a waveform with a less degree of distortion and no interference of high-frequency electromagnetic wave. The alternator designed by this method has not only all the advantages of the existing inverting generator, but also a manufacturing cost consumedly lower than the existing inverting generator, even lower than a general universal generator, without the high-frequency electromagnetic wave, thus meeting the existing European EMC certification requirements.

According to the present disclosure, a technical solution involves a method of generating electricity by an alternator. The method includes: connecting in series stator coils of two multi-pole permanent-magnet generators that can generate equiamplitude alternating currents of different frequencies to generate equiamplitude alternating currents of different frequencies that are superimposed to generate an amplitude-modulation alternating current with envelope lines having an amplitude that changes with a voltage difference between two equiamplitude alternating currents; rectifying the amplitude-modulation alternating current positively and negatively through a controllable rectifying circuit; and filtering the amplitude-modulation alternating current to output an alternating current having a frequency of the envelope lines.

In the method of the present disclosure, when there is a difference of two cycles between cycle amounts of the two multi-pole permanent-magnet generators, the method generates an amplitude-modulation superimposed waveform having a change of two periods, and also generates a complete sine waveform through positive and negative rectifying and shaping of the amplitude-modulation superimposed waveform.

In the method of the present disclosure, the equiamplitude alternating currents of different frequencies are generated by the two multi-pole permanent-magnet generators having different numbers of magnetic poles and installed coaxially. In the method of the present disclosure, the equiamplitude alternating currents of different frequencies can also be generated by the two multi-pole permanent-magnet generators having different rotational speeds and an equal number of the magnetic poles.

In the method of the present disclosure, the controllable rectifying circuit is preferably a controllable silicon rectifying circuit, and the use of the controllable silicon rectifying circuit for positive and negative rectification of the amplitude-modulation alternating current is well known in the art, with the controllable silicon rectifying circuit not defined specifically in the present disclosure.

The present disclosure also provides an alternator manufactured by the above method, which comprises: two multi-pole permanent-magnet generators configured to generate the equiamplitude alternating currents of different frequencies, a controllable rectifying circuit, and a shaping and filtering circuit. The stator coils of the two multi-pole permanent-magnet generators are connected in series and connected in turn to the controllable rectifying circuit and to the shaping and filtering circuit.

The present disclosure has a number of advantages. By the method of the present disclosure, the alternator can generate a sine wave output voltage having a waveform with a less degree of distortion and no interference of high-frequency electromagnetic wave. The alternator manufactured by this method has not only all the advantages of the existing inverting generator, but also a manufacturing cost consumedly lower than the existing inverting generator, even lower than a general universal generator, without the high-frequency electromagnetic wave, thus meeting the existing European EMC certification requirements.

BRIEF DESCRIPTION OF THE DRAWINGS

The present disclosure will further be described below with reference to drawings and examples.

DETAILED DESCRIPTION OF THE PREFERRED EMBODIMENTS

EXAMPLE 1

Figure 1:
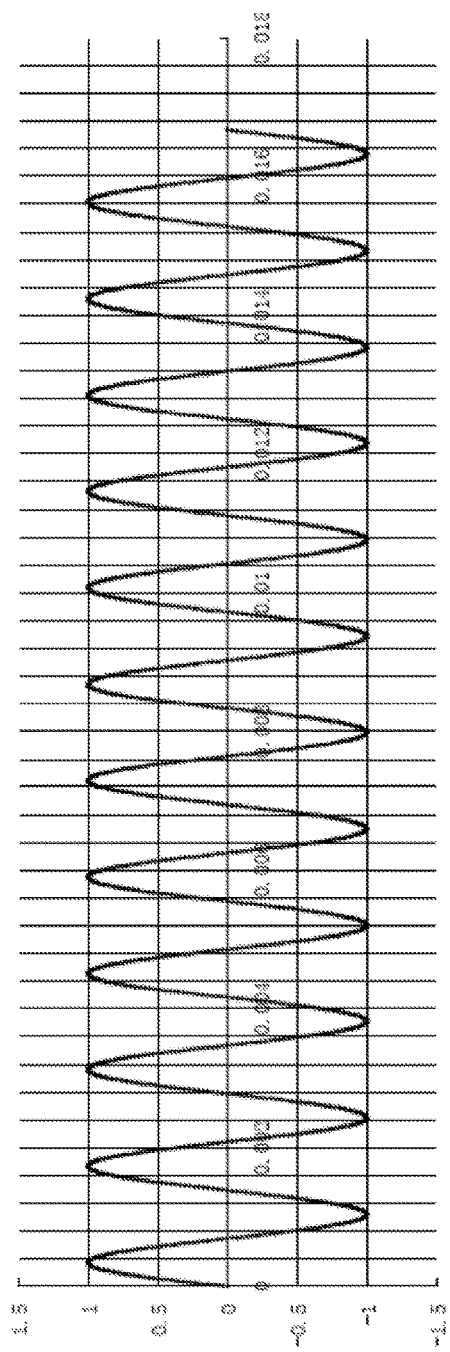
FIG. 1 is a high-frequency sine waveform diagram of the alternating current outputted by the primary multi-pole permanent-magnet generator in accordance with the present disclosure.
Figure 2:
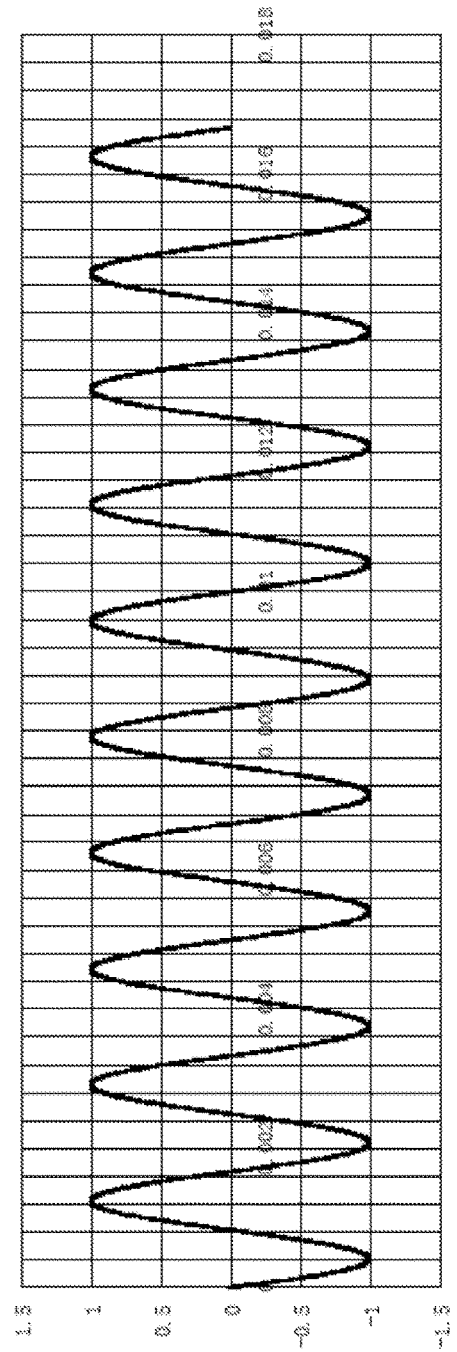
FIG. 2 is a high-frequency sine waveform diagram of the alternating current outputted by the secondary multi-pole permanent-magnet generator of the present disclosure.
Figure 3:
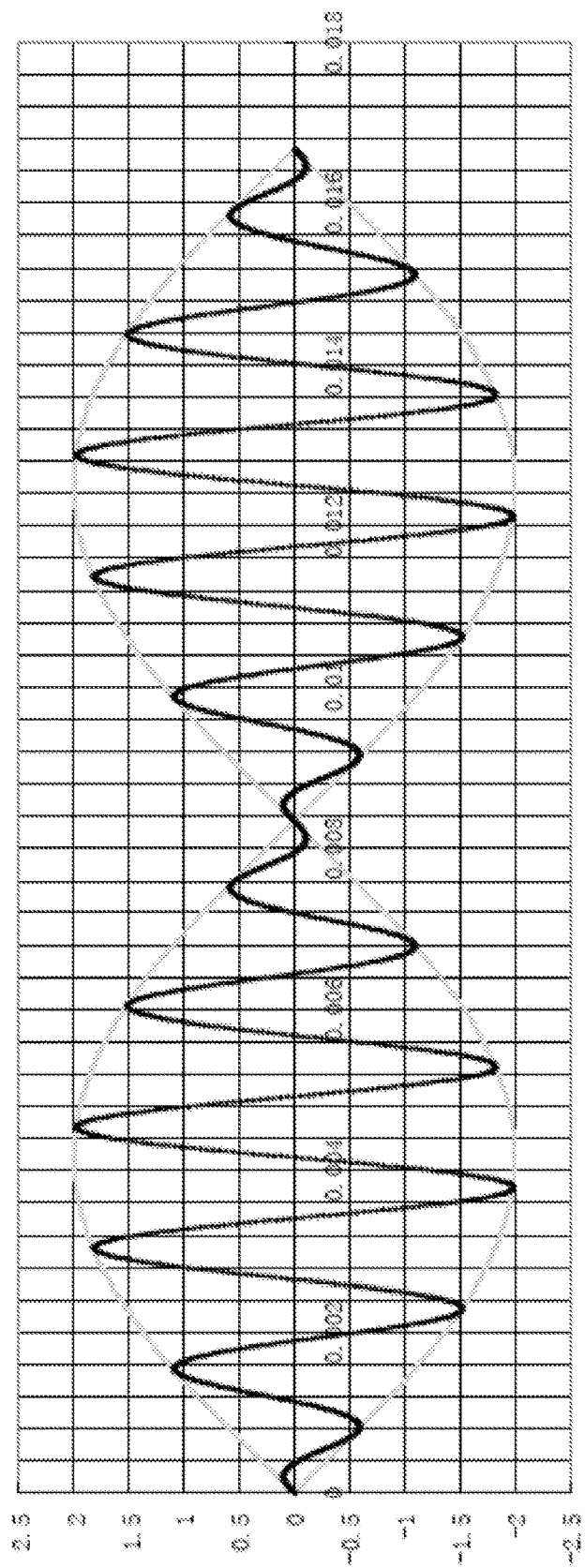
FIG. 3 is a voltage waveform diagram of the superimposed alternating current outputted by the primary and secondary multi-pole permanent-magnet generators of the present disclosure
Figure 4:
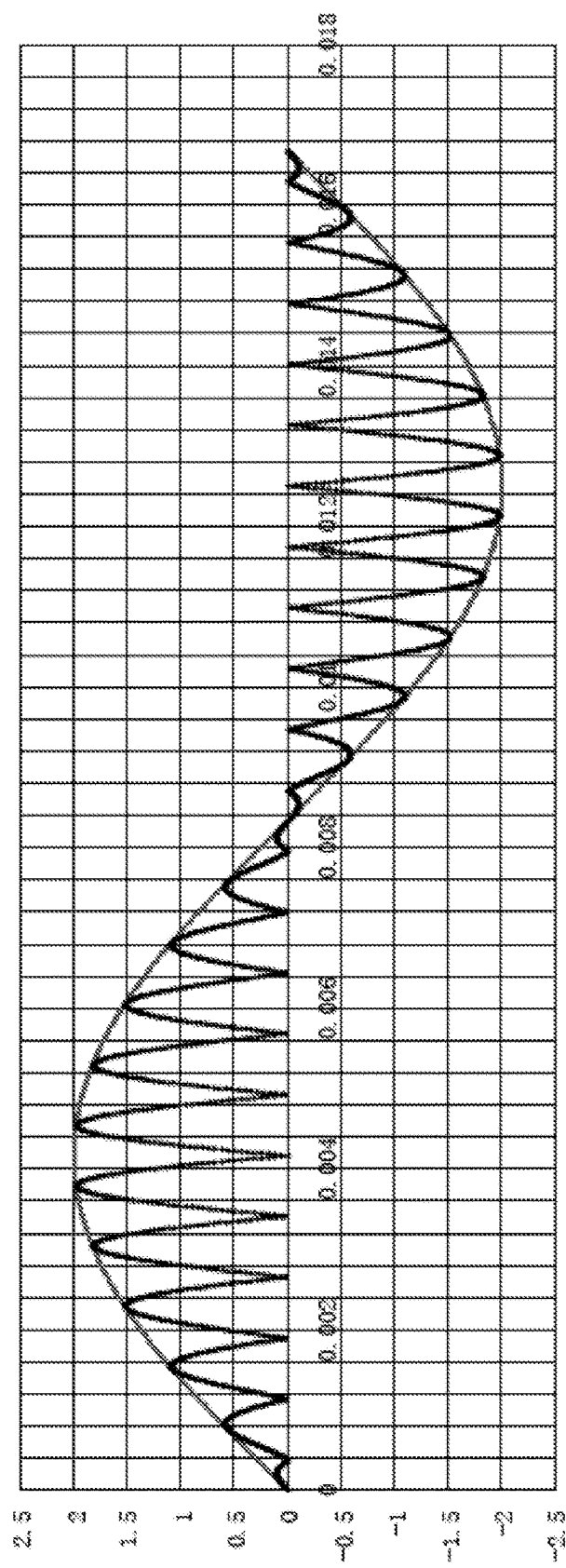
FIG. 4 is a voltage waveform diagram of the voltage waveform generated by superimposing that has been rectified positively and negatively in accordance with the present disclosure.
Figure 5:
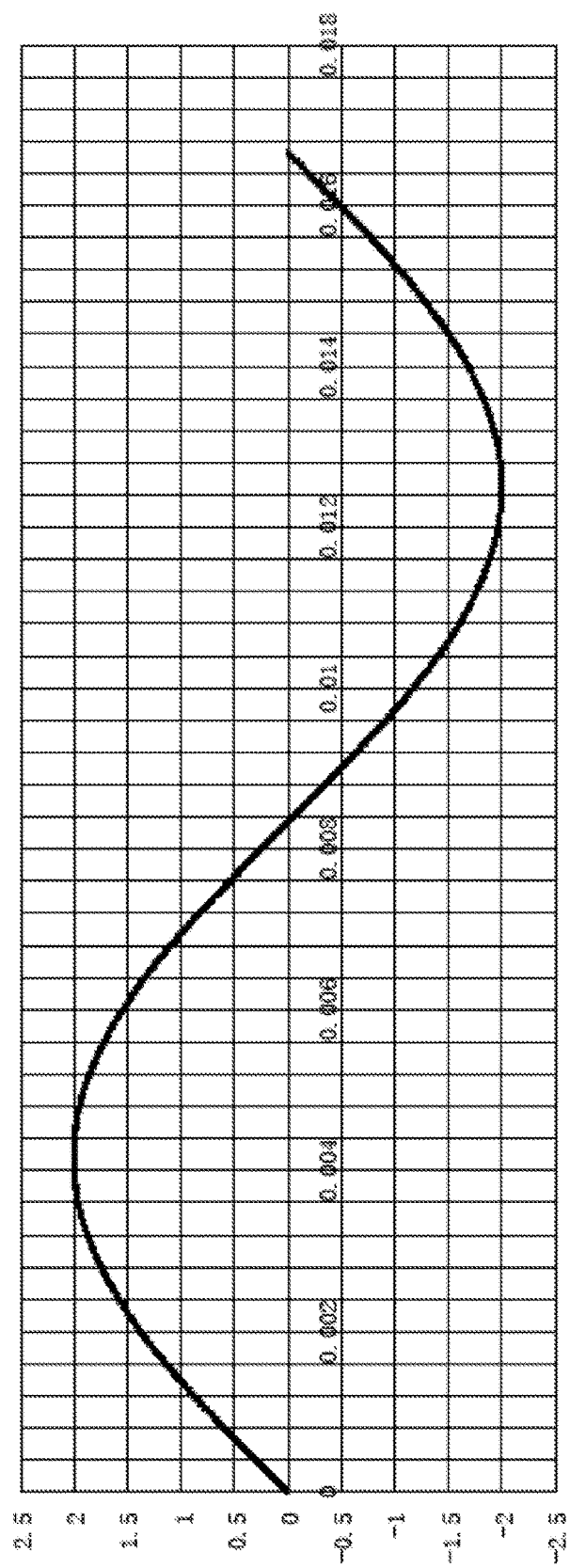
FIG. 5 is a sine waveform diagram of the voltage waveform after the positive and negative rectification that has been shaped and filtered in accordance with the present disclosure.

The present disclosure provides a method of generating electricity by an alternator, which first needs two (primary and secondary) multi-pole permanent-magnet generators, which can generate an equiamplitude alternating current of different frequencies. In this example, the primary and secondary multi-pole permanent-magnet generators both include 10 pairs of S-N monopole magnetic tiles and correspond to the multi-pole permanent-magnet generator of the 30-pole three-phase stator coil, but the shafts of the two generators are independent of each other and have different rotational speed, wherein the rotational speed of the secondary multi-pole permanent-magnet generator is lower than that of the primary multi-pole permanent-magnet generator. Specifically, FIG. 1 is a high-frequency sine waveform diagram of the alternating current outputted by the primary multi-pole permanent-magnet generator; while FIG. 2 is a high-frequency sine waveform diagram of the alternating current outputted by the secondary multi-pole permanent-magnet generator, whose cycle amount is two waves more than the primary permanent-magnet generator. The stator coils of the above two multi-pole permanent-magnet generators are connected in series, so as to make the two equiamplitude alternating currents of different frequencies superimposed on each other to generate an amplitude-modulation alternating current with envelope lines having an amplitude changing with voltage difference of two equiamplitude alternating currents, with the AC voltage waveform as shown in FIG. 3; then the above amplitude-modulation alternating current is rectified positively and negatively through a controllable silicon rectifying circuit, thus forming an alternating current output having frequency of the envelope lines (the envelope line of the AC voltage waveform is just the sine wave of the desired frequency), as shown in FIG. 4; finally the waveform is shaped and filtered to generate the sine alternating current of the desired frequency, as shown in FIG. 5.

Figure 6:
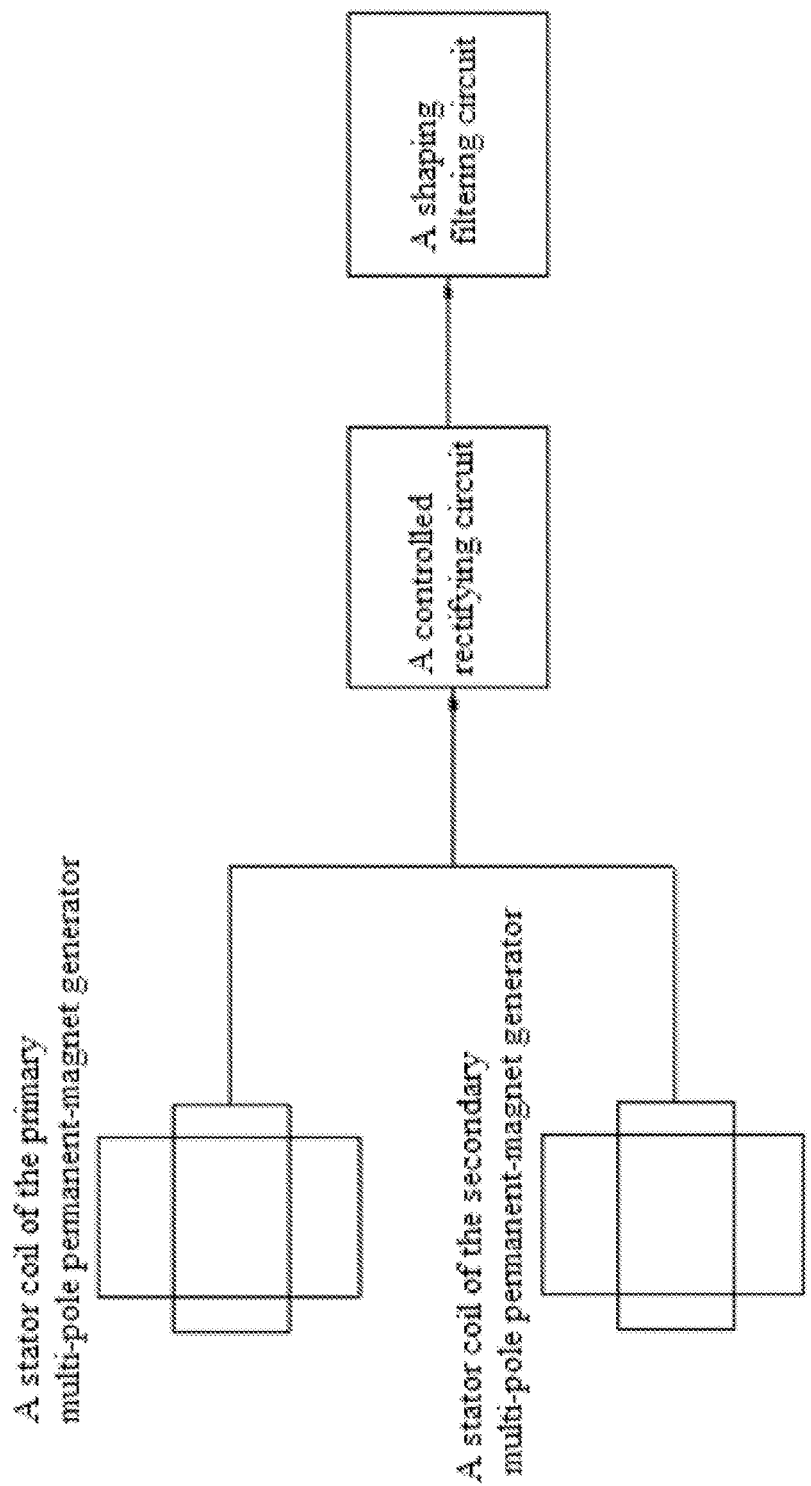
FIG. 6 is a schematic diagram of the circuit connection structure of the alternator of the present disclosure.

FIG. 6 shows an alternator designed according to the above method, wherein the stator coils of the two multi-pole permanent-magnet generators are connected in series and then connected in turn to the controllable rectifying circuit and the shaping filtering circuit, with the controllable rectifying circuit being a controllable silicon rectifying circuit.

EXAMPLE 2

Compared with Example 1, the primary multi-pole permanent-magnet generator of Example 2 includes 12 pairs of S-N monopole magnetic tiles and corresponds to the multi-pole permanent-magnet generator of the 36-pole three-phase stator coil, while the secondary multi-pole permanent-magnet generator includes 10 pairs of S-N monopole magnetic tiles and corresponds to the multi-pole permanent-magnet generator of the 30-pole three-phase stator coil. The two generators are connected to one and the same shaft and have the same rotational speed. Still making reference to FIG. 1, FIG. 1 is a high-frequency sine waveform diagram of the alternating current outputted by the primary multi-pole permanent-magnet generator. FIG. 2 is a high-frequency sine waveform diagram of the alternating current outputted by the secondary multi-pole permanent-magnet generator, whose cycle amount is two waves more than the primary permanent-magnet generator. The stator coils of the above two multi-pole permanent-magnet generators are connected in series, so as to make the two equiamplitude alternating currents of different frequencies superimposed on each other to generate an amplitude-modulation alternating current with envelope lines having an amplitude changing with voltage difference of two equiamplitude alternating currents, with the AC voltage waveform as shown in FIG. 3. Next, the above amplitude-modulation alternating current is rectified positively and negatively through a controllable silicon rectifying circuit, thus forming an alternating current output having frequency of the envelope lines (the envelope line of the AC voltage waveform is just the sine wave of the desired frequency), as shown in FIG. 4. Finally, the waveform is shaped and filtered to generate the sine alternating current of the desired frequency, as shown in FIG. 5.

By the method of the present disclosure, the alternator can generate a sine wave output voltage having a waveform with a less degree of distortion and no interference of high-frequency electromagnetic wave. The alternator manufactured by this method has not only all the advantages of the existing inverting generator, but also a manufacturing cost consumedly lower than the existing inverting generator, even lower than a general universal generator, without the high-frequency electromagnetic wave, thus meeting the existing European EMC certification requirements.

What is claimed is:

1. A method of generating electricity by an alternator, comprising:
   connecting in series stator coils of two multi-pole permanent-magnet generators that are configured to generate equiamplitude alternating currents of different frequencies that are superimposed to generate an amplitude-modulation alternating current with envelope lines having an amplitude that changes with a voltage difference between two equiamplitude alternating currents;
   rectifying the amplitude-modulation alternating current positively and negatively through a controllable rectifying circuit; and
   filtering the amplitude-modulation alternating current to output an alternating current having frequency of the envelope lines.

2. The method of generating electricity by an alternator according to claim 1, further comprising:
when there is a difference of two cycles between cycle amounts of the two multi-pole permanent-magnet generators, generating an amplitude-modulation superimposed waveform having a change of two periods; and generating a complete sine waveform through positive and negative rectifying and shaping of the amplitude-modulation superimposed waveform.

3. The method of generating electricity by an alternator according to claim 1, wherein generating the equiamplitude alternating currents of different frequencies comprises generating the equiamplitude alternating currents of different frequencies by the two multi-pole permanent-magnet generators having different numbers of magnetic poles and installed coaxially.

4. The method of generating electricity by an alternator according to claim 1, wherein generating the equiamplitude alternating currents of different frequencies comprises generating the equiamplitude alternating currents of different frequencies by the two multi-pole permanent-magnet generators having different rotational speeds and an equal number of magnetic poles.

5. The method of generating electricity by an alternator according to claim 1, wherein the controllable rectifying circuit comprises a controllable silicon rectifying circuit.

6. An alternator comprising:
two multi-pole permanent-magnet generators configured to generate the equiamplitude alternating currents of different frequencies;
a controllable rectifying circuit; and
a shaping and filtering circuit,
wherein the stator coils of the two multi-pole permanent-magnet generators are connected in series and connected in turn to the controllable rectifying circuit and to the shaping and filtering circuit.

* * * * *